United States Patent [19]
Konopka et al.

[11] Patent Number: 5,834,924
[45] Date of Patent: Nov. 10, 1998

[54] IN-RUSH CURRENT REDUCTION CIRCUIT FOR BOOST CONVERTERS AND ELECTRONIC BALLASTS

[75] Inventors: John G. Konopka, Barrington; Kenneth D. Labudda, Arlington Heights; Dennis L. Stephens, Niles; Anand K. Upadhyay, Libertyville, all of Ill.

[73] Assignee: Motorola Inc., Schaumburg, Ill.

[21] Appl. No.: 811,862

[22] Filed: Mar. 5, 1997

Related U.S. Application Data

[63] Continuation of Ser. No. 536,411, Sep. 29, 1995, abandoned.
[51] Int. Cl.$^6$ .................................................... G05F 1/56
[52] U.S. Cl. .............................. 323/222; 323/908; 363/53
[58] Field of Search .................................... 323/222, 282, 323/908; 363/56, 49, 53; 361/58, 111; 315/206

[56] References Cited

U.S. PATENT DOCUMENTS

| | | | |
|---|---|---|---|
| 4,251,752 | 2/1981 | Stolz | 315/206 |
| 4,631,470 | 12/1986 | Bingley | 323/282 |
| 4,910,654 | 3/1990 | Forge | 363/49 |
| 5,283,707 | 2/1994 | Conners et al. | 361/58 |

*Primary Examiner*—Adolf Berhane
*Attorney, Agent, or Firm*—Gary J. Cunningham; Kenneth D. Labudda

[57] ABSTRACT

An electronic power supply circuit (50) that includes a rectifying circuit (14), a boost converter (16), an in-rush current reduction circuit (52), and a bulk capacitor (18). The in-rush current reduction circuit (52) includes an in-rush current limiting resistor (54) and a bypass capacitor (56) that are connected in parallel with each other. An improved version of the in-rush current reduction circuit (52) includes a bypass diode (58) connected in parallel with the in-rush current limiting resistor (54) and bypass capacitor (56) which is oriented to provide a path for current flowing out of bulk capacitor (18). One particular application of the disclosed circuit is for use in an electronic ballast for fluorescent lamps.

17 Claims, 2 Drawing Sheets

IN-RUSH CURRENT REDUCTION CIRCUIT FOR BOOST CONVERTERS AND ELECTRONIC BALLASTS

This is a continuation of application Ser. No. 08/536.411, filed Sept. 29, 1995 and now abandoned.

FIELD OF THE INVENTION

The present invention relates to the general subject of power supplies and, in particular, to an in-rush current reduction circuit for boost converters and electronic ballasts.

Background of the Invention

In-rush current is an inherent characteristic of many types of electronic circuits which possess a large bulk capacitance. In-rush current is a transient pulse of current which is generated when power is first applied to the circuit. The amplitude of the in-rush current pulse is maximized when power is first applied to the circuit at the peak of the AC line voltage cycle. The peak value of the high current pulse drawn by the circuit from the AC line source in such a case is customarily referred to as the peak in-rush current.

Electronic ballasts provide a very efficient method of powering fluorescent lamps. For purposes of achieving high power factor and low total harmonic distortion in the AC line current waveform, many types of electronic ballasts employ a high frequency boost converter front-end which is operated at frequencies in excess of 20,000 Hertz. Along with considerable advantages, however, boost converters also possess the important disadvantage of significant in-rush current.

Excessive in-rush current is highly undesirable, having been associated with nuisance tripping of circuit breakers as well as degradation and welding of switch contacts on AC line-side equipment such as relays and occupancy sensors. An additional disadvantage of high in-rush current is the resulting design requirement of high surge current ratings for those circuit components through which the in-rush pulse flows.

In order to explain the phenomenon of in-rush current, reference is made to the prior art power supply shown in FIG. 2. In use, when power is first applied to power supply 10, boost switch 38 is open and remains in the off state until boost controller 36 begins driving boost switch 38 at some future time long after the in-rush pulse has subsided. Because bulk capacitor 18 is initially uncharged, a large current pulse flows through the circuit path from AC source 12 through diode 26, boost inductor 34, boost diode 40, bulk capacitor 18, diode 30, and back to AC source 12. The high current pulse may cause boost inductor 34 to saturate, in which case its inductance momentarily reverts to what is commonly referred to as its saturated value. The in-rush pulse subsides only when the voltage across bulk capacitor 18 approaches the peak instantaneous voltage of AC source 12.

The peak value of the in-rush pulse is dependent upon both the in-rush path impedance (consisting of the inductance and equivalent series resistance of boost inductor 34, the equivalent series resistance of bulk capacitor 18, as well as the resistance and inductance associated with AC source 12 and the voltage of AC source 12.

In addition, during operation a second in-rush current path exists, and follows the circuit path from AC source 12 through diode 26, filter capacitor 32, diode 30, and back to AC source 12. Since the capacitance of filter capacitor 32 is, in most applications, on the order of at least one hundred times smaller than that of bulk capacitor 18, filter capacitor 32 peak charges much more rapidly than bulk capacitor 18, the result being that the in-rush pulse which flows in the second in-rush path through filter capacitor 32 has a much shorter duration than the in-rush pulse which flows in the first in-rush path through bulk capacitor 18. Although the peak value of the in-rush pulse which flows in the second in-rush path is usually much smaller than that which flows in the first path, it is important to understand that the present invention does not reduce or otherwise affect that portion of the in-rush current which flows in the path through filter capacitor 32. Reduction in the peak of the in-rush current pulse which flows through filter capacitor 32 would require a circuit quite different from that of the present invention.

Known approaches which have been used to reduce in-rush current include the following:

Synchronize application of AC power to the circuit with the "zero crossing" of the AC line voltage by use of a power switch, such as a FET or triac, driven by a zero-crossing detector;

Temporarily increase the series resistance seen by the AC power source during the period when AC power is first applied to the circuit by placing a fixed resistor in series with the AC line source, and bypassing the resistor by way of a power switch at some future time after the in-rush pulse has subsided;

Placing a thermistor in series with the AC line source;

Permanently increase the series impedance present between the AC power line and the bulk capacitance by placing a fixed resistor in series with the AC line source.

The first two approaches require considerable additional circuitry and/or costly power components. The third approach involves only one component but has the critical disadvantage of thermal recovery time, resulting in higher in-rush current if AC power is removed and subsequently reapplied before the thermistor has had enough time to sufficiently cool down. The fourth approach is extremely simple and straightforward but is quite inefficient and may entail prohibitive power dissipation.

It is therefore apparent that an in-rush current reduction circuit which requires only a few inexpensive passive components and which does not possess the disadvantage of thermal recovery time or prohibitively high power dissipation would constitute a significant improvement over the prior art.

DETAILED DESCRIPTION OF A PREFERRED EMBODIMENT

Figure 1:
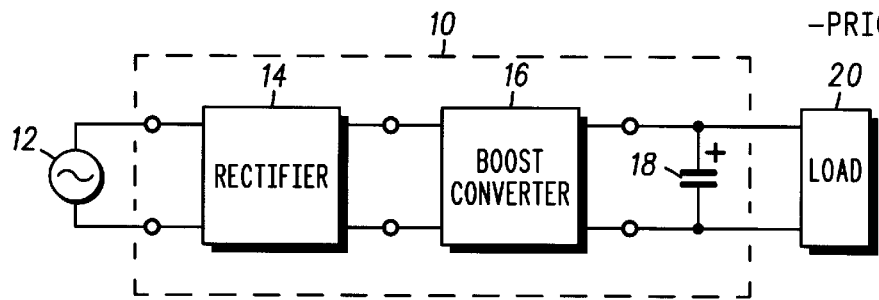
FIG. 1 is a block diagram of a prior art power supply circuit which includes a boost converter.
Figure 2:
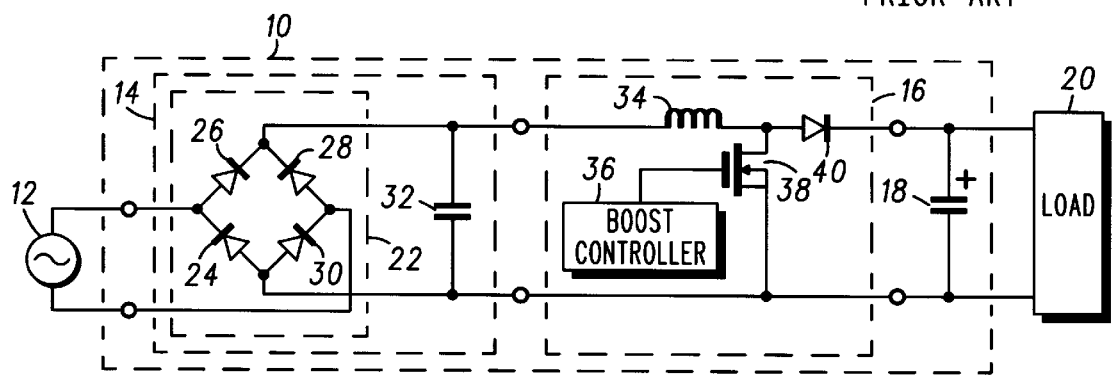
FIG. 2 is an electrical schematic of the prior art power supply circuit outlined in FIG. 1.
Figure 3:
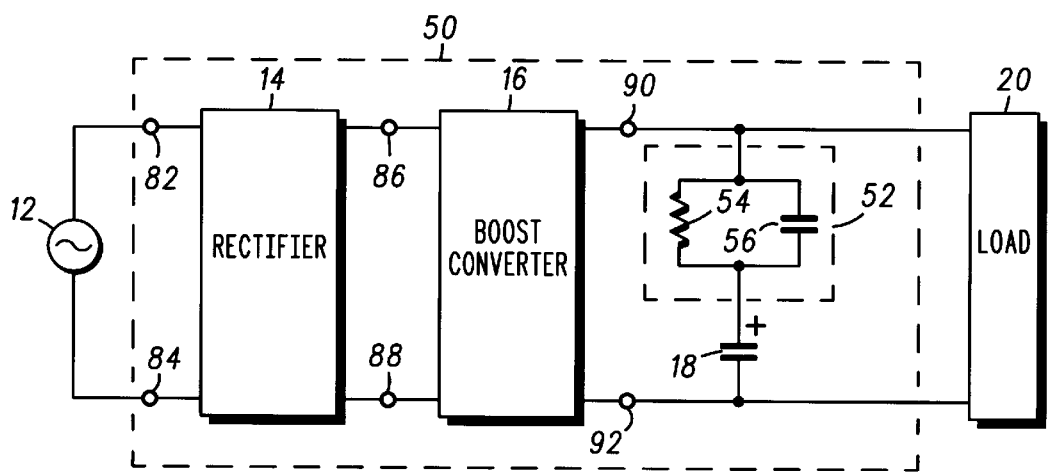
FIG. 3 is a block diagram of a power supply circuit which includes a boost converter and an in-rush current reduction circuit, in accordance with the present invention.
Figure 4:
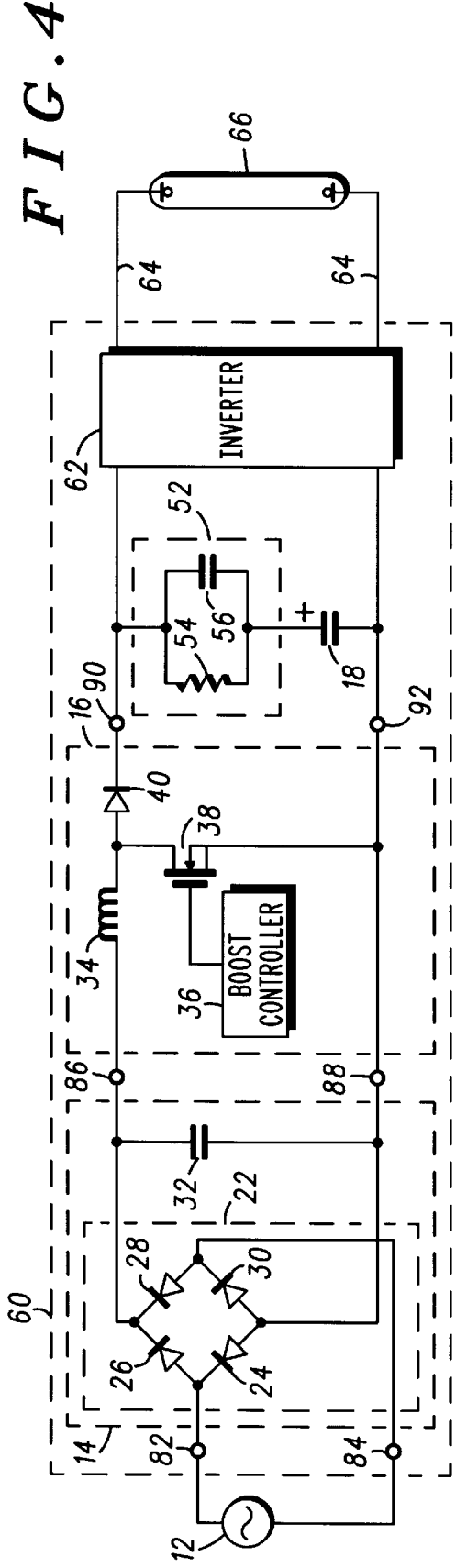
FIG. 4 is an electrical schematic of an electronic ballast for fluorescent lamps, in accordance with the present invention.
Figure 5:
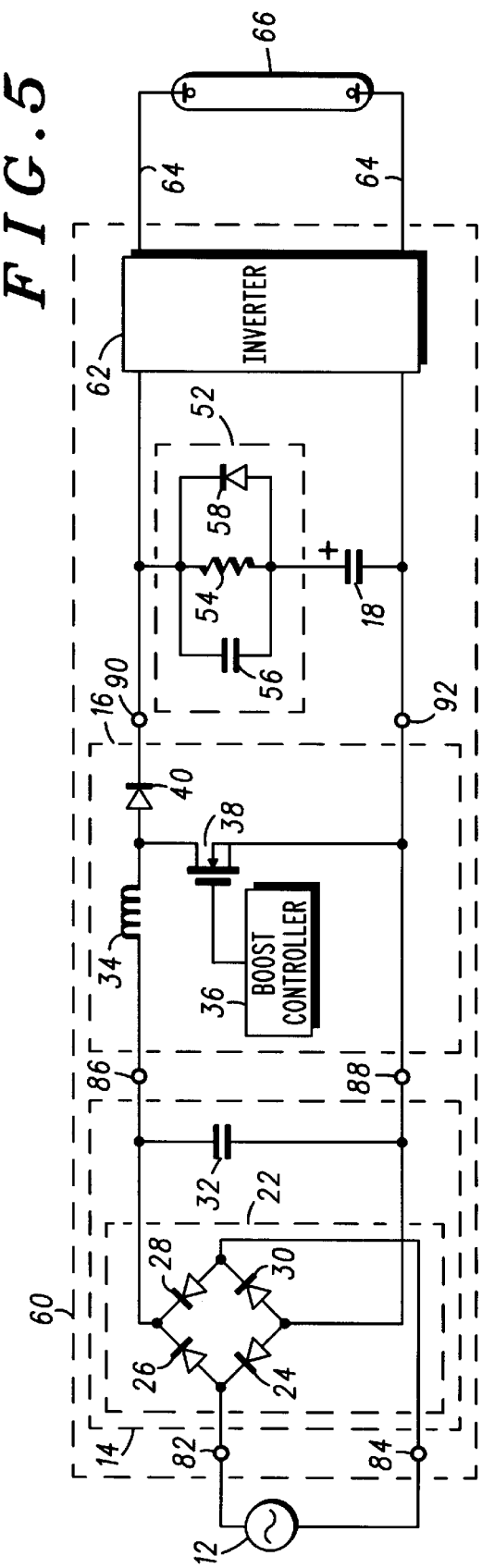
FIG. 5 is an electrical schematic of an electronic ballast for fluorescent lamps in which the in-rush current reduction circuit is improved by the addition of a bypass diode, in accordance with the present invention.

An in-rush current reduction circuit for boost converters and electronic ballasts is shown in FIGS. 3, 4, and 5.

Referring to FIG. 3, an electronic power supply circuit 50 is shown. In its simplest form, the power supply circuit 50 includes a rectifying circuit 14 having a pair of input terminals for receiving a source of alternating current 12 and having a pair of output terminals, a boost converter 16 having a pair of input terminals and having a pair of output terminals, the input terminals of the boost converter 16 being coupled to the output terminals of the rectifying circuit; and a series circuit that is coupled across the output terminals of the boost converter 16 and that includes an in-rush current reduction circuit 52 and a bulk capacitance 18, the bulk capacitance 10 comprising at least one capacitor, and the in-rush current reduction circuit 52 comprising an in-rush current limiting resistor 54 and a bypass capacitor 56 connected in parallel with each other. This circuit can provide a substantial reduction in the peak in-rush current. The output terminals of the boost converter 16 are adapted to having a load 20 connected across them. In a preferred embodiment, the load 20 can include an inverter and one or more fluorescent lamps.

FIG. 4 shows a schematic of the power supply circuit adapted for use as an electronic ballast for driving gas discharge lamps. The ballast 60 comprises a rectifier circuit 14, a boost converter 16, an in-rush current reduction circuit 52, a bulk capacitor 18, and an inverter 62 adapted to light one or more fluorescent lamps 66.

Rectifier circuit 14 comprises a diode bridge 22 and a filter capacitor 32. Diode bridge 22 consists of diodes 24, 26, 28, and 30. An input side of rectifier circuit 14 is coupled to an alternating current (AC) source 12 by way of rectifier input terminals 82 and 84, and an output side of rectifier circuit 14 is coupled to an input side of the boost converter 16 by way of boost converter input terminals 86 and 88.

Boost converter 16 comprises a boost inductor 34, a boost switch 38, a boost diode 40, and a boost controller 36. An output side of boost converter 16 is coupled to an input side of inverter 62, as well as a series circuit including in-rush current reduction circuit 52 and bulk capacitor 18, by way of boost converter output terminals 90 and 92. Boost converter 16 operates in a known fashion, as is described in U.S. Pat. No. 5,191,263.

Inverter 62 is coupled to one or more fluorescent lamps 66 by way of an inverter output bus 64. Inverter output bus 64 comprises a plurality of terminals, the number of which is dependent upon the nature, number, and configuration of the fluorescent lamps 66.

In one embodiment, the in-rush current reduction circuit 52 includes an in-rush current limiting resistor 54 and a bypass capacitor 56 connected in parallel with each other.

The function of in-rush current limiting resistor 54 is to increase the series resistance present in the in-rush path during the period when AC power is first applied to ballast 60, thereby reducing the peak in-rush current.

The function of bypass capacitor 56 is to minimize the power dissipated in in-rush current limiting resistor 54 during steady-state operation by providing a low impedance path around resistor 54 for high frequency current supplied to bulk capacitor 18 (i.e., current flowing into the positive terminal of bulk capacitor 18) by operation of boost converter 16.

As long as its capacitance value is properly chosen, capacitor 56 exerts essentially no effect upon the peak value of the in-rush pulse. This is due to the fact that, when properly sized, capacitor 56 charges up very rapidly early on in the in-rush period, and develops an appreciable voltage prior to the onset of saturation in boost inductor 34 and any other inductances which are present in the path between the AC source 12 and bulk capacitor 18. Consequently, the in-rush current pulse is forced to flow almost entirely through resistor 54. Stated in functional terms, capacitor 56 behaves as an approximate open-circuit during the period in which the in-rush pulse occurs.

The peak in-rush current which flows in the in-rush path through bulk capacitor 18 is directly related to the resistance of in-rush current limiting resistor 54. Accordingly, a larger resistance value for resistor 54 results in lower peak in-rush current, while a smaller resistance value results in higher peak in-rush current. The converse is true with regard to the steady-state power dissipated in resistor 54. Furthermore, increasing the resistance of resistor 54 past a certain point has the negative effect of disrupting the desired operation of the boost converter itself by not providing an adequate (i.e., low enough impedance) discharge path for the voltage which tends to build up on bypass capacitor 56 during steady-state operation. Therefore, the maximum resistance value which can be used for resistor 54 is limited by the constraints of power dissipation and desired boost converter operation.

For purposes of minimizing the power dissipation in in-rush current limiting resistor 54, it is advisable to use a large capacitance value for bypass capacitor 56. However, the largest capacitance value which can be used without defeating the in-rush current reduction function of circuit 52 is entirely dependent upon the equivalent series inductance present in the in-rush path (i.e., the inductance of boost inductor 34, in series combination with that of AC source 12 and any other components present in the series path between AC source 12 and bulk capacitance 18) and the capacitance of bulk capacitor 18. The initial rate of rise of the in-rush current pulse is a function of the equivalent series inductance. Once the in-rush current pulse has reached a level high enough to saturate boost inductor 34, the consequent reduction in inductance causes the rate of rise of the in-rush pulse to increase dramatically. Since in-rush current reduction circuit 52 is truly effective only if bypass capacitor 56 charges to a voltage sufficient to render it an effective open circuit (thereby forcing the in-rush current to flow through resistor 54) before the in-rush current pulse has reached a level high enough to saturate boost inductor 34, it is essential that bypass capacitor 56 charge at no less than a certain minimal rate dictated by the equivalent series inductance. Since a smaller capacitance charges at a faster rate than a larger one, it follows that the capacitance for bypass capacitor 56 must not exceed a certain value if the desired reduction in peak in-rush current is to be achieved. Accordingly, the larger the equivalent series inductance is, the higher the value of capacitance which can be used for bypass capacitor 56 and, hence, the lower the power which will be dissipated in resistor 54 under steady-state conditions.

Due to differences in boost inductor construction, boost converter power levels, and the inductance of the AC source itself, the equivalent series inductance encountered from one application to another can be expected to vary over a considerable range. Accordingly, the resistance of in-rush current limiting resistor 54 and the capacitance of bypass capacitor 56 can generally span a wide range of design values covering three or more orders of magnitude. It is, of course, the two competing constraints of desired in-rush current reduction and maximum acceptable power dissipation in in-rush current limiting resistor 54 which end up dictating suitable values for in-rush current limiting resistor 54 and bypass capacitor 56 in a given application.

In one embodiment, in a circuit adapted for use in connection with electronic ballasts, the in-rush current limiting resistor is in the range of about 0.1 ohm to about 10,000 ohms and the capacitance of the bypass capacitor is in the range of about 0.1 microfarad to about 10 microfarads, for a good compromise of the competing requirements of reduced in-rush current and low power dissipation in the in-rush current limiting resistor.

Referring now to FIG. 5, the in-rush current reduction circuit 52 can be further enhanced by including a bypass diode 58 in parallel with in-rush current limiting resistor 54 and bypass capacitor 56. Bypass diode 58 allows for further reduction in the steady-state power dissipated in in-rush current limiting resistor 54 by providing an alternative path for current flowing out of bulk capacitor 18. So, whereas bypass capacitor 56 provides a path around in-rush current limiting resistor 54 for high frequency current flowing into bulk capacitor 18, bypass diode 58 provides a path around in-rush current limiting resistor 54 for current flowing out of bulk capacitor 18. Bypass capacitor 56 and bypass diode 52 therefore function together to minimize the power dissipated in in-rush current limiting resistor 54 during steady-state operation. At the same time, since bypass diode 58 is reverse biased during the period in which the in-rush pulse flows, the presence of bypass diode 58 has absolutely no effect upon the in-rush current itself.

An important advantage of the present invention is its simplicity and its use of a few inexpensive passive components which may be easily integrated into the circuit boards of modern electronic power supplies and ballasts. Another advantage is the absence of any recovery time problems, thereby rendering the present invention effective in limiting in-rush current in cases in which the AC power supplied to the power supply or ballast is momentarily interrupted. Still another advantage is that system component cost may be reduced in that, for example, input rectifier diodes with lower surge current ratings may be used.

In one prototype test of the invention substantially as shown in FIG. 5, use of the in-rush current limiting circuit reduced the peak in-rush current from 40 Amperes to 22 Amperes, at the cost of approximately one-half watt of power dissipation in the in-rush current limiting resistor.

The principles of the present invention are directly applicable to many systems involving a high frequency boost converter in which the higher power dissipation, increased component count and/or cost, or other undesirable effects which arise from use of existing methods for in-rush current reduction are unacceptable.

Although the present invention has been described with reference to a certain preferred embodiment, numerous modifications and variations can be made by those skilled in the art without departing from the novel spirit and scope of this invention.

What is claimed is:
1. An electronic power supply circuit, comprising:
a rectifying circuit having a pair of input terminals for receiving a source of alternating current and having a pair of output terminals;
a boost converter having a pair of input terminals and having a pair of output terminals, the input terminals of the boost converter being coupled to the output terminals of the rectifying circuit; and
a series circuit that is coupled across the output terminals of the boost converter and that includes a passive in-rush current reduction circuit and a bulk capacitor, the passive in-rush current reduction circuit comprising an in-rush current limiting resistor and a bypass capacitor connected in parallel with each other, wherein:
the in-rush current limiting resistor and the bypass capacitor are coupled between the bulk capacitor and a first output terminal of the boost converter;
the bulk capacitor is coupled between the in-rush current reduction circuit and a second output terminal of the boost converter;
an in-rush current flows into the bulk capacitor for a predetermined transient period following initial application of power to the power supply, the in-rush current having a peak value;
the boost converter supplies a high frequency current to the bulk capacitor during steady-state operation of the power supply; and
the passive in-rush current reduction circuit includes:
a transient mode wherein, following initial application of power to the power supply, a substantial portion of the in-rush current flows through the in-rush current limiting resistor, thereby effecting a reduction in the peak value of the in-rush current; and
a steady-state mode wherein a substantial portion of the high frequency current supplied to the bulk capacitor by the boost converter flows through the bypass capacitor, thereby effecting a reduction in the steady-state power dissipated in the in-rush current limiting resistor.

2. The circuit of claim 1, wherein the in-rush current reduction circuit includes a bypass diode connected in parallel with the in-rush current limiting resistor and the bypass capacitor, wherein the bypass diode is oriented to provide a path around the in-rush current limiting resistor for current flowing out of the bulk capacitor.

3. The circuit of claim 1, wherein the boost converter comprises:
a boost inductor connected between a first node and a second node, and the first node is coupled to the first input terminal of the boost converter;
a boost switch connected between the second node and a third node, and the third node is coupled to the second input terminal of the boost converter and the second output terminal of the boost converter;
a boost rectifier connected between the second node and a fourth node, and the fourth node is coupled to the first output terminal of the boost converter; and
a control circuit for driving the boost switch.

4. The circuit of claim 1, wherein the rectifying circuit comprises a full-wave diode bridge.

5. The circuit of claim 1, wherein the output terminals of the boost converter are adapted to having a load connected across them.

6. The circuit of claim 1, wherein the bypass capacitor has a predetermined capacitance to provide a low impedance path around the in-rush current limiting resistor for high frequency current flowing into the bulk capacitance.

7. The circuit of claim 6, wherein the resistance of the in-rush current limiting resistor is in the range of about 0.1 ohm to about ten thousand ohms, and the capacitance of the bypass capacitor is in the range of about 0.1 microfarad to about 10 microfarads.

8. An electronic power supply circuit, comprising:
a rectifying circuit having a pair of input terminals for receiving a source of alternating current and having a pair of output terminals, wherein the rectifying circuit comprises a full-wave diode bridge;

a boost converter having a pair of input terminals and having a pair of output terminals, the input terminals of the boost converter being coupled to the output terminals of the rectifying circuit, wherein the output terminals of the boost converter are adapted to having a load connected between them, and wherein the boost converter comprises:
  a boost inductor connected between a first node and a second node, wherein the first node is coupled to a first input terminal of the boost converter;
  a boost switch connected between the second node and a third node, wherein the third node is coupled to a second input terminal of the boost converter and a second output terminal of the boost converter;
  a boost rectifier connected between the second node and a fourth node, wherein the fourth node is coupled to a first output terminal of the boost converter; and
  a control circuit for driving the boost switch; and
a series circuit that is coupled across the output terminals of the boost converter and that includes a passive in-rush current reduction circuit and a bulk capacitor, the passive in-rush current reduction circuit comprising an in-rush current limiting resistor and a bypass capacitor connected in parallel with each other, wherein:
  the in-rush current limiting resistor and the bypass capacitor are coupled between the bulk capacitor and the first output terminal of the boost converter;
  the bulk capacitor is coupled between the in-rush current reduction circuit and the second output terminal of the boost converter;
an in-rush current flows into the bulk capacitor for a predetermined transient period following initial application of power to the power supply, the in-rush current having a peak value;
the boost converter supplies a high frequency current to the bulk capacitor during steady-state operation of the power supply; and
the passive in-rush current reduction circuit includes:
  a transient mode wherein, following initial application of power to the power supply, a substantial portion of the in-rush current flows through the in-rush current limiting resistor, thereby effecting a reduction in the peak value of the in-rush current; and
  a steady-state mode wherein a substantial portion of the high frequency current supplied to the bulk capacitor by the boost converter flows through the bypass capacitor, thereby effecting a reduction in the steady-state power dissipated in the in-rush current limiting resistor.

9. The circuit of claim 8, wherein the in-rush current reduction circuit includes a bypass diode connected in parallel with the in-rush current limiting resistor and the bypass capacitor, wherein the bypass diode is oriented to provide a path around the in-rush current limiting resistor for current flowing out of the bulk capacitor.

10. An electronic ballast for powering gas discharge lamps, comprising:
  a rectifying circuit having a pair of input terminals for receiving a source of alternating current and having a pair of output terminals;
  a boost converter having a pair of input terminals and having a pair of output terminals, the input terminals of the boost converter being coupled to the output terminals of the rectifying circuit;
  a series circuit that is coupled across the output terminals of the boost converter and that includes a passive in-rush current reduction circuit and a bulk capacitor, the passive in-rush current reduction circuit comprising an in-rush current limiting resistor and a bypass capacitor connected in parallel with each other, wherein:
    the in-rush current limiting resistor and the bypass capacitor are coupled between the bulk capacitor and a first output terminal of the boost converter;
    the bulk capacitor is coupled between the in-rush current reduction circuit and a second output terminal of the boost converter;
  an in-rush current flows into the bulk capacitor for a predetermined transient period following initial application of power to the ballast, the in-rush current having a peak value;
  the boost converter supplies a high frequency current to the bulk capacitor during steady-state operation of the ballast; and the passive in-rush current reduction circuit includes:
    a transient mode wherein, following initial application of power to the ballast, a substantial portion of the in-rush current flows through the in-rush current limiting resistor, thereby effecting a reduction in the peak value of the in-rush current; and
    a steady-state mode wherein a substantial portion of the high frequency current supplied to the bulk capacitor by the boost converter flows through the bypass capacitor, thereby effecting a reduction in the steady-state power dissipated in the in-rush current limiting resistor; and an inverter that is coupled across the output terminals of the boost converter, the inverter being adapted to light at least one fluorescent lamp.

11. The electronic ballast of claim 10, wherein the in-rush current reduction circuit includes a bypass diode connected in parallel with the in-rush current limiting resistor and the bypass capacitor, wherein the bypass diode is oriented to provide a path around the in-rush current limiting resistor for current flowing out of the bulk capacitor.

12. The electronic ballast of claim 10, wherein the boost converter comprises:
  a boost inductor connected between a first node and a second node, and the first node is coupled to the first input terminal of the boost converter;
  a boost switch connected between the second node and a third node, and the third node is coupled to the second input terminal of the boost converter and the second output terminal of the boost converter;
  a boost rectifier connected between the second node and a fourth node, and the fourth node is coupled to the first output terminal of the boost converter; and
  a control circuit for driving the boost switch.

13. The electronic ballast of claim 10, wherein the rectifying circuit comprises a full-wave diode bridge.

14. The electronic ballast of claim 10, wherein the bypass capacitor has a predetermined capacitance to provide a low impedance path around the in-rush current limiting resistor for high frequency current flowing into the bulk capacitance.

15. The electronic ballast of claim 14, wherein the resistance of the in-rush current limiting resistor is in the range of about 0.1 ohm to about ten thousand ohms, and the capacitance of the bypass capacitor is in the range of about 0.1 microfarad to about 10 microfarads.

16. An electronic ballast for powering gas discharge lamps, comprising:
  a rectifying circuit having a pair of input terminals for receiving a source of alternating current and having a pair of output terminals, wherein the rectifying circuit comprises a full-wave diode bridge;

a boost converter having a pair of input terminals and having a pair of output terminals, the input terminals of the boost converter being coupled to the output terminals of the rectifying circuit, wherein the boost converter comprises:
  a boost inductor connected between a first node and a second node, wherein the first node is coupled to a first input terminal of the boost converter;
  a boost switch connected between the second node and a third node, wherein the third node is coupled to a second input terminal of the boost converter and a second output terminal of the boost converter;
  a boost rectifier connected between the second node and a fourth node, wherein the fourth node is coupled to a first output terminal of the boost converter; and
  a control circuit for driving the boost switch; and a series circuit that is coupled across the output terminals of the boost converter and that includes a passive in-rush current reduction circuit and a bulk capacitor, the passive in-rush current reduction circuit comprising an in-rush current limiting resistor and a bypass capacitor connected in parallel with each other, wherein:
  the in-rush current limiting resistor and the bypass capacitor are coupled between the bulk capacitor and the first output terminal of the boost converter;
  the bulk capacitator is coupled between the in-rush current reduction circuit and the second output terminal of the boost converter;

an in-rush current flows into the bulk capacitor for a predetermined transient period following initial application of power to the ballast, the in-rush current having a peak value;
  the boost converter supplies a high frequency current to the bulk capacitor during steady-state operation of the ballast; and the passive in-rush current reduction circuit includes:
    a transient mode wherein, following initial application of power to the ballast, a substantial portion of the in-rush current flows through the in-rush current limiting resistor, thereby effecting a reduction in the peak value of the in-rush current; and
    a steady-state mode wherein a substantial portion of the high frequency current supplied to the bulk capacitor by the boost converter flows through the bypass capacitor, thereby effecting a reduction in the steady-state power dissipated in the in-rush current limiting resistor; and an inverter that is coupled across the output terminals of the boost converter, the inverter being adapted to light at least one fluorescent lamp.

17. The electronic ballast of claim 16, wherein the in-rush current reduction circuit includes a bypass diode connected in parallel with the in-rush current limiting resistor and the bypass capacitor, wherein the bypass diode is oriented to provide a path around the in-rush current limiting resistor for current flowing out of the bulk capacitor.

* * * * *